May 24, 1966 G. H. BARNES ETAL 3,253,162

SHIFT REGISTER EMPLOYING ENERGY TRANSFER BETWEEN CAPACITOR AND INDUCTOR MEANS TO EFFECT SHIFT

Filed Nov. 18, 1963

INVENTORS.
GEORGE H. BARNES
PAUL WINSOR III
BY
Vincent L. Carney
ATTORNEY 3,253,162

SHIFT REGISTER EMPLOYING ENERGY TRANSFER BETWEEN CAPACITOR AND INDUCTOR MEANS TO EFFECT SHIFT

George H. Barnes, West Chester, and Paul Winsor III, Paoli, Pa., assignors to Burroughs Corporation, Detroit, Mich., a corporation of Michigan Filed Nov. 18, 1963, Ser. No. 324,557
14 Claims. (Cl. 307—88.5)

This invention relates to electrical pulse handling circuits and more particularly, relates to shift registers.

Shift registers have a wide application in the electronics industry and particularly in digital communications systems. They are used to delay voltage pulses, to store digital information, to count voltage pulses, and to convert serial digital information to parallel digital information.

It is desirable for these shift registers to operate very rapidly and accurately. They must perform in this manner with a minimum of components. To obtain simplicity and compactness in construction, it is desirable to use capacitors or inductors to store the information rather than more complicated circuit elements.

However, if the bits of information are transferred directly from capacitor to capacitor, three-quarters of the energy stored in one capacitor is lost during the transfer.

Accordingly, it is an object of this invention to provide an improved shift register.

It is a further object of this invention to provide a rapidly operating shift register without using an excessive number of components.

It is a still further object of this invention to provide a shift register in which excessive energy is not lost in the transfer of bits of information from one stage to the other.

In accordance with the above objects a shift register is provided in which the bits of information are stored as voltages on capacitors in each stage of the shift register. In transferring energy from one stage to the other, the energy in the capacitor is transferred to an inductor from the capacitor and then it is transferred from the inductor either directly to another capacitor in the next stage of the shift register or to a current valve which is controlled so as to enable a capacitor in the next stage to be charged. The energy of the bit of information which is stored in the electric field of the capacitor is completely converted into the energy of the inductor's magnetic field and then transferred to the succeeding stage. The duration of the double transfer is approximately one-half cycle of the resonant frequency of either capacitor and the inductor.

Each capacitor of the shift register is in series with the primary winding of a transformer. Shift voltage pulses are applied to the capacitor and primary winding. Each shift pulse has a width which is approximately one-fourth of a cycle of the resonant frequency of the capacitor and primary winding of the transformer. If the capacitor is already charged, no current will flow through the winding; but if the capacitor is not charged, a current will flow and the capacitor will become charged.

When the magnetic field built up in the transformer decays, the resulting voltage in the secondary of the transformer opens a current valve which is connected across the capacitor of the next stage so as to discharge this capacitor. In this way, if the capacitor in the preceding stage is not charged, the capacitor in the next stage is discharged so as to be in the same state as was the capacitor in the preceding stage, and if the capacitor in the preceding stage is charged, the capacitor in the next stage will retain the charge which it obtained from the shift pulse.

The invention and the above noted other features thereof will be understood more clearly and fully from the following detailed description with reference to the accompanying drawings in which.

Figure 1:
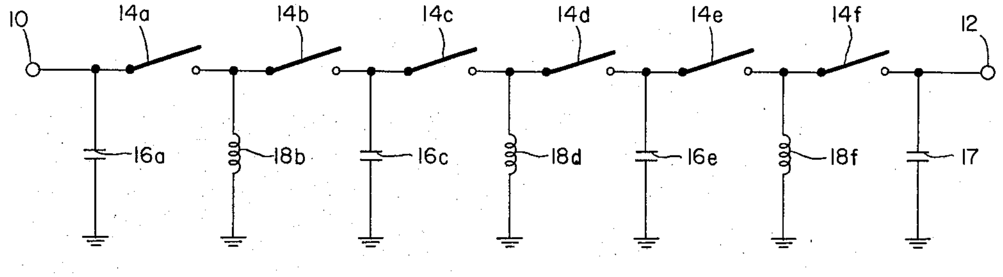
FIGURE 1 is a schematic circuit diagram illustrating the invention.

In FIGURE 1, the schematic circuit diagram, which illustrates the invention, includes an input terminal 10 and an output terminal 12 with six switches **14*a*–14*f*, electrically connected in series between the terminals 10 and 12. Each of the four capacitors 16*a*, 16*c* and 16*e* and 17 have one plate electrically connected to a corresponding one of the input terminal sides of the switches 14*a*, 14*c*, 14*e* and terminal 12. The other plate of each of the capacitors is grounded. One end of each of the inductors 18*b*, 18*d*, and 18*f* is electrically connected to a corresponding one of the remaining switches 14*b*, 14*d*, and 14*f*; the other end of each of the three inductors 18 is grounded. Of course, more stages may be included and outputs may be taken from any of the intermediate capacitors such as 16*c* and 16*e***.

A voltage pulse applied to input terminal 10 may be stored on capacitor **16*a* for long periods of time. If it is desired to shift this pulse from 16*a* to 16*c*, the switch 14*a* is first closed. The energy stored in the electrical field of the capacitor 16*a* is now converted into energy of the magnetic field of the inductor 18*b***.

The current through the switch **14*a* is at a maximum when the voltage across the capacitor is zero. The magnetic field energy at this time is equal to one-half of the inductance of the inductor 18*b*** times the current squared. In a lossless network the energy is transferred between the capacitor and the inductor without diminution.

When the current begins to decrease, the switch **14*a* is opened and the switch 14*b* is closed. The energy stored in the magnetic field of the inductor 18*b* is now discharged into the capacitor 16*c*. The switch 14*b* is now opened and the voltage pulse may be read from the capacitor 16*c* if desired. In a similar manner, the voltage may be transferred to the capacitor 16*e* and to the output terminal 12**.

By transferring the energy from a capacitor to an inductor rather than directly between two capacitors, energy is conserved in the system and fewer active components are needed. Amplifiers are not necessary to make up for the losses along the switches but may be desirable. When the transfer is made between two capacitors, the voltage is averaged between the two capacitors. Since the energy in the capacitor is equal to the voltage squared times the capacitance over two, one-quarter of the energy remains in the first capacitor, one-quarter of the energy is transferred to the second capacitor and the remaining half of the energy is radiated or dissipated. In contrast to this, all of the energy may be transferred when an intermediate inductor is used.

Figure 2:
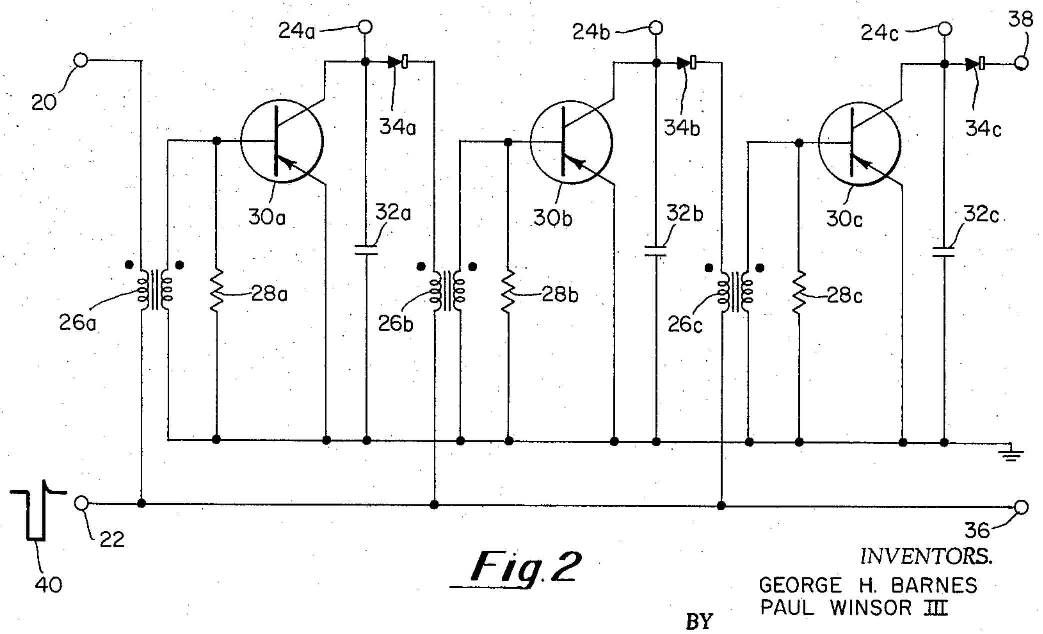
FIGURE 2 is a schematic circuit diagram of an embodiment of the invention.

In FIGURE 2 a schematic circuit diagram of a shift register embodying the invention is shown having an input terminal 20, a shift pulse terminal 22, and output terminals **24*a*, 24*b* and 24*c*. In this circuit one end of the secondary windings of transformers 26*a*, 26*b*, and 26*c*, one end of the resistors 28*a*, 28*b*, and 28*c*, the emitters of PNP transistors 30*a*, 30*b*, and 30*c*, and one plate of the capacitors 32*a*, 32*b*, and 32*c*, are each grounded. The other end of the secondary winding of transformer 26*a* and the other end of the resistor 28*a* are electrically connected to the base of the transistor 30*a*; the other end of the secondary winding of the transformer 26*b* and the other end of the resistor 28*b* are electrically connected to the base of the transistor 30*b*; and, the other end of the secondary winding of the transformer 26c and the other end of the resistor 28c are electrically connected to the base of the transistor 30c**.

The other plate of the capacitor 32a is electrically connected to the collector of the transistor 30a, to the output terminal 24a, and to the anode of the diode 34a; the other plate of the capacitor 32b is electrically connected to the collector of the transistor 30b, to the output terminal 24b and to the anode of the diode 34b; and, the other plate of the capacitor 32c is electrically connected to the collector of the transistor 30c, to the output terminal 24c, and to the anode of the diode 34c. The shift pulse terminal 22 is electrically connected to one end of the primary winding of the transformer 26a, to one end of the primary winding of the transformer 26b, to one end of the primary winding of the transformer 26c, and to the terminal 36. The input terminal 20 is electrically connected to the other end of primary winding of the transformer 26a. The cathode of the diode 34a is electrically connected to the other end of the primary winding of the transformer 26b; the cathode of the diode 34b is electrically connected to the other end of the primary winding of the transformer 26c; and, the cathode of the diode 34c is electrically connected to the terminal 38. Of course, additional stages may be added between the terminals 38 and 36 or a ring counter may be formed by electrically connecting the terminal 38 to the terminal 20.

The transformers 26a–26c, may have a ratio of one-to-one and one millihenry inductance; the transistors 30a–30c may be of the type 2N123; the capacitors 32a–32c may be 0.0068 microfarads; the resistors 28a–28c may have 120 ohms and the diodes 34a–34c may be of the type 1N270.

In the shift register of FIGURE 2 a binary "zero" is indicated by a potential of a negative 6 volts and a binary "one" is represented by a potential close to ground. These potentials are stored on the capacitors 32a–32c and are indicated at the output terminals 24a–24c, measured through a high impedance. A shift pulse 40 having an amplitude of a negative 6 volts and having a time-width equal to one-quarter of a cycle of the resonant frequency of the capacitance of one of the capacitors 32 and the inductance of one of the transformers 26, is applied to the shift pulse terminal 22.

When the six volt clock pulse is applied to terminal 22 the capacitors 32 which are in the binary "one" state will be charged to the binary "zero" state; the capacitors 32 which are already in the binary "zero" state are unaffected by the shift pulse. Thus, immediately after a shift pulse 40 has been applied to the terminal 22 each of the capacitors 32 is charged to a negative 6 volts indicating a binary "zero." If a capacitor was previously in binary "one" state, charging current will flow through the associated transformer 26 as the capacitor is charged to the binary "zero" state. When the field created by this current flow collapses, current is drawn from the base of the transistor 30 of the succeeding stage causing it to conduct. This transistor, in turn, discharges the capacitor 32 which is connected between its emitter and its collector so as to bring it into the binary "one" state. In this way binary "one" is passed from one stage of the shift register to the next stage of the shift register each time a shift pulse 40 is applied to terminal 22. The remaining stages are left in the binary "zero" state to which they have been directly charged by the shift pulse voltage 40.

Assume that terminal 20 is charged to a negative 6 volts, capacitor 32a is charged to a negative 6 volts, capacitor 32b is close to ground potential, capacitor 32c is charged to a negative 6 volts, and a clock pulse of a negative 6 volts is applied to terminal 22. No current flows through transformers 26a and 26b. However, current flows through transformer 26c as the capacitor 32b charges to a negative 6 volts. After the capacitor 32b is fully charged and the field in the transformer 26c begins to collapse, current is drawn from the base of the transistor 30c driving it into conduction. This causes current to flow between the emitter and collector of the transistor 30c so as to discharge the capacitor 32c. The transistors 30a and 30b remain non-conductive. It can be seen that the negative 6 volts applied to terminal 20 now appears at output terminal 24a, the negative 6 volts from capacitor 32a now appears at output terminal 24b, and the ground level voltage formerly on capacitor 32b now appears at the output terminal 24c. Each binary digit has been shifted one place. This process is repeated each time the negative clock pulse 40 is applied to the terminal 22. The shift register shown in FIGURE 2 operates in the range between 10 kilocycles and 80 kilocycles.

Figure 3:
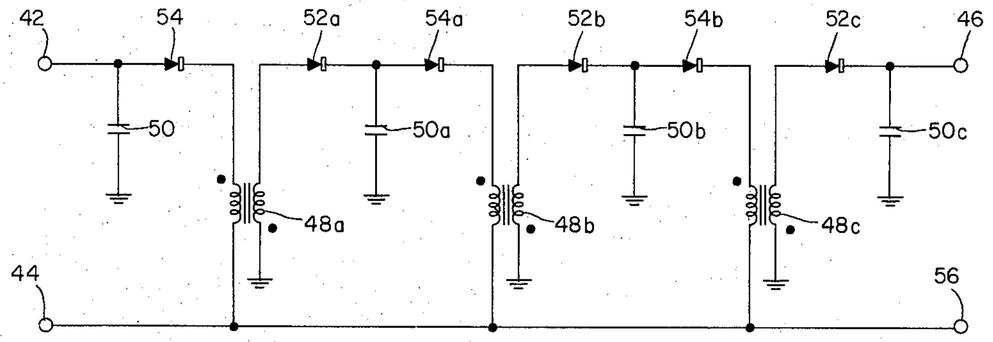
FIGURE 3 is a schematic circuit diagram of another embodiment of the invention.

In FIGURE 3 a schematic circuit diagram of another shift register is shown having an input terminal 42, a shift pulse terminal 44, and an output terminal 46. In this circuit one end of the secondary windings of the transformers 48a, 48b, and 48c and one plate of the capacitors 50, 50a, 50b and 50c, are each grounded. Also one end of the primary windings of the transformers 48a, 48b, and 48c are electrically connected to the shift pulse terminal 44.

A corresponding one of the diodes 52a, 52b, and 52c has its anode electrically connected to the other end of the secondary winding of a corresponding one of the transformers 48a, 48b, and 48c, and has its cathode electrically connected to a corresponding one of the other plates of the capacitors 50a, 50b and 50c. The diode 54 has its anode electrically connected to the other plate of the capacitor 50 and its cathode connected to the other end of the primary winding of the transformer 48a; the diode 54a has its anode electrically connected to the other plate of the capacitor 50a and has its cathode electrically connected to the other end of the primary winding of the transformer 48b; and, the diode 54b has its anode electrically connected to the other plate of the capacitor 50b and has its cathode electrically connected to the other end of the primary winding of the transformer 48c. The terminal 56 is electrically connected to the shift pulse terminal 44.

The bits of information in the shift register of FIGURE 3 are represented by either zero voltage or a positive 6 volts. A positive 6 volts is normally applied to the shift pulse terminal 44. When it is desired to shift information from capacitor to capacitor in the shift register, the voltage at terminal 44 is lowered to zero volts for one-quarter of a cycle of the resonant frequency of any capacitor and transformer combination. If a positive 6 volts is stored in a capacitor, current flows through the associated forward biased diode 54 and through the primary windings of the associated transformer when the potential on the shift line is reduced to zero volts. If the voltage on a capacitor already is near ground potential, no current will flow.

After the one-quarter of a cycle zero-voltage pulse the voltage on the shift line is raised to a positive 12 volts for a quarter of a cycle. This reverse biases the diodes 54 and prevents them from conducting. If current has been drawn through the primary winding of a transformer, the decayed field will cause current to flow in the secondary winding into the next capacitor of the shift register charging it to a positive 6 volts. In this way the 6 volt pulses are moved from stage to stage of the shift register.

The shift registers of this invention are simple and economical for their speed. They are entirely solid state, compact and reliable. With very small capacitors extremely high speeds may be reached and at economical cost per bit.

Obviously, many modifications and variations of the present invention are possible in the light of the above teachings. It is therefore, to be understood that within the scope of the appended claims, the invention may be practiced otherwise than as specifically described.

What is claimed is:

1. The combination comprising:

an input terminal adapted to receive voltage pulses;

first capacitor means, electrically connected to said input terminal, for storing said input voltage pulses;

inductor means, having a first terminal electrically connected to said first capacitor means and having a second terminal, for receiving a voltage from said first capacitor means, for temporarily storing energy transferred by said voltage, and for passing said voltage to said second terminal after the build-up of a magnetic field in said inductor means;

second capacitor means, electrically connected to said second terminal of said inductor means, for storing said voltage received from said second terminal of said inductor means; and an output terminal, electrically connected to said second capacitor means, whereby the voltage on said second capacitor means may be utilized.

2. The combination according to claim 1 in which said inductor means comprises:

an inductor;

first switch means, electrically connected to said first capacitor means and to said inductor, for selectively passing energy between said first capacitor means and said inductor; and second switch means, electrically connected to said inductor and to said second capacitor means, for selectively passing electrical energy between said inductor and said second capacitor means.

3. The combination according to claim 2 in which said first switch means comprises a diode.

4. The combination comprising:

a signal input terminal adapted to receive signal voltage pulses;

a first capacitor electrically connected to said signal input terminal;

an inductor;

first current-valve means, having a first terminal electrically connected to said first capacitor and having a second terminal electrically connected to said inductor, for causing energy to flow between said capacitor and said inductor;

a second capacitor;

second current-valve means, electrically connected between said inductor and said second capacitor, for causing energy to flow between said inductor and said second capacitor;

a clock pulse input terminal electrically connected to said inductor and being adapted to receive periodic clock pulses having a predetermined pulse-width;

said inductor and said first capacitor, in combination, having a resonant frequency and having values of inductance and capacitance such that one quarter of a cycle of their resonant frequency is equal to said predetermined pulse-width; and an output terminal electrically connected to said second capacitor.

5. A shift register for shifting a signal indicated by either a first potential or a second potential comprising:

first and third energy storage means for maintaining a voltage applied to them;

second energy storage means comprising an inductive element;

shift pulse means for periodically adding energy to and changing the potential of said first storage means when said first storage means has said first potential and for adding energy to and changing the potential of said third storage means when said third storage means has said first potential;

first switch means electrically connected between said first and second energy storage means for providing energy to said second storage means for storage in a magnetic field created therein only when said first storage means receives energy from said shift pulse means; and second switch means, electrically connected between said second and third energy storage means, for returning said third storage means to said first potential level from said second potential level only after said second storage means receives energy through said first switch means and has stored the same by developing a magnetic field therein.

6. A shift register for shifting a signal indicated by either a first potential or a second potential according to claim 5 in which said first and third energy storage means are capacitors and said second energy storage means is a transformer so connected that it transfers energy to said third energy storage means only upon the collapse of a magnetic field therein.

7. A shift register for shifting a signal indicated by either a first potential or a second potential according to claim 6 in which said first switch means comprises a diode.

8. A shift register for shifting a signal indicated by either a first potential or a second potential according to claim 7 in which said second switch means comprises a PNP transistor having a base, emitter, and collector and having its base electrically connected to said transformer, its collector electrically connected to said third storage means, and its emitter electrically connected to ground.

9. A shift register for shifting a signal indicated by either a first potential or a second potential according to claim 8 in which said shift pulse means comprises a source of negative clock pulses electrically connected to said transformer.

10. A shift register comprising:

a plurality of resonant circuits;

each of said resonant circuits having a resonant wavelength and being characterized by having a capacitance means for storing energy and maintaining a charge and an inductance means;

switch means for selectively connecting the capacitance means and inductance means of the resonant circuits upon receipt of a shift signal;

input terminal means, electrically connected to one of said resonant circuits, for charging said one of said capacitive means when a voltage pulse is applied to said input terminal means, and shift means, electrically connecting each of said resonant circuits in a fixed sequence, for periodically transferring the charge from each of said capacitive means to the capacitive means in the succeeding resonant circuit of said predetermined sequence.

11. A shift register according to claim 10 in which said shift means comprises a means for applying voltage pulses to said resonant circuits having a width which is equal to one-fourth of the resonant wave length of said resonant circuits.

12. A shift register according to claim 11 in which each of said shift means further comprises current-valve means inductively coupling each resonant circuit to the succeeding resonant circuit.

13. In a shift register the combination comprising:

a first transformer having a primary winding adapted to be connected to a first stage of said shift register and having a secondary winding with a first secondary-winding terminal and a second secondary-winding terminal;

a resistor being electrically connected at one end to said first secondary-winding terminal;

a PNP transistor having a base, emitter, and collector and having its base electrically connected to said first secondary-winding terminal;

a capacitor having one plate electrically connected to the collector of said PNP transistor;

a diode having an anode and a cathode and having its anode electrically connected to the collector of said PNP transistor; and a second transformer having a primary winding and having a secondary winding adapted to be connected to a second stage of said shift register and having one end of its primary winding electrically connected to the cathode of said diode and the other end of its primary winding adapted to be connected to a source of negative clock pulses;

said secondary winding terminals, the other end of said resistor, the emitter of said PNP transistor, and another plate of said capacitor each being electrically connected to ground.

14. In a shift register the combination comprising:

a first transformer having a primary winding adapted to be connected to a first stage of said shift register and having a secondary winding with a first secondary-winding terminal and a second secondary-winding terminal;

a first diode having an anode and a cathode and having its anode electrically connected to said first secondary-winding terminal;

a capacitor having one plate electrically connected to the cathode of said first diode and having its other plate grounded;

said second secondary-winding terminal being grounded;

a second diode having an anode and a cathode and having its anode electrically connected to the cathode of said first diode;

a second transformer having a primary winding and having a secondary winding adapted to be connected to a second stage of said shift register and having one end of its primary winding electrically connected to the cathode of said second diode and having the other end of its primary winding adapted to be connected to a source of clock pulses.

References Cited by the Examiner

UNITED STATES PATENTS

| | | | |
|---|---|---|---|
| 2,594,336 | 4/1952 | Mohr | 307—88.5 |
| 2,847,159 | 8/1958 | Curtis | 328—37 |
| 2,898,579 | 8/1959 | Moore | 307—88.5 |
| 3,069,662 | 12/1962 | Kaiser | 307—88.5 |
| 3,087,074 | 4/1963 | Carroll et al. | 307—88.5 |
| 3,119,983 | 1/1964 | Carroll et al. | 307—88.5 |

ARTHUR GAUSS, *Primary Examiner.*

J. ZAZWORSKY, *Assistant Examiner.*